United States Patent [19]
Keipert

[11] 3,786,693
[45] Jan. 22, 1974

[54] DETENT MECHANISM FOR RELEASABLY SECURING RELATIVELY ROTATABLE MEMBERS
[75] Inventor: Hans K. Keipert, Glenview, Ill.
[73] Assignee: Teletype Corporation, Skokie, Ill.
[22] Filed: May 25, 1972
[21] Appl. No.: 256,867

[52] U.S. Cl. ............................ 74/527, 64/29
[51] Int. Cl. .............................. G05g 5/06
[58] Field of Search ............... 74/527, 444; 64/29

[56] References Cited
UNITED STATES PATENTS
2,983,121   5/1961   Naas .................................. 64/29
3,068,667  12/1962   Sussman ............................ 64/29

Primary Examiner—Charles J. Myhre
Assistant Examiner—Frank H. McKenzie, Jr.
Attorney, Agent, or Firm—John L. Landis

[57] ABSTRACT

First and second disks are mounted on a common shaft for rotation relative to each other, the second disk being releasably urged into contact with the first disk by a spring. A plurality of ball detents disposed about the face of the second disk seat in a plurality of radially extending grooves formed in the face of the first disk. This permits the disks to be releasably secured in a fixed angular relationship by the force of the spring. Any desired one of a plurality of angular relationships between the disks may be selected by rotating the disks relative to each other through a desired angle. The selected angular relationship is then maintained by the urging force of the spring which seats the plurality of ball detents in adjacent ones of the plurality of grooves. Each of the plurality of ball detents is freely movable longitudinally over an adjustment range to automatically seat each ball detent in a corresponding one of the plurality of grooves. In one example, the adjustable disks are gears, driven alternately, to provide a paper feeding drive of variable stroke for a teleprinter.

6 Claims, 6 Drawing Figures

PATENTED JAN 22 1974 3,786,693
SHEET 1 OF 2
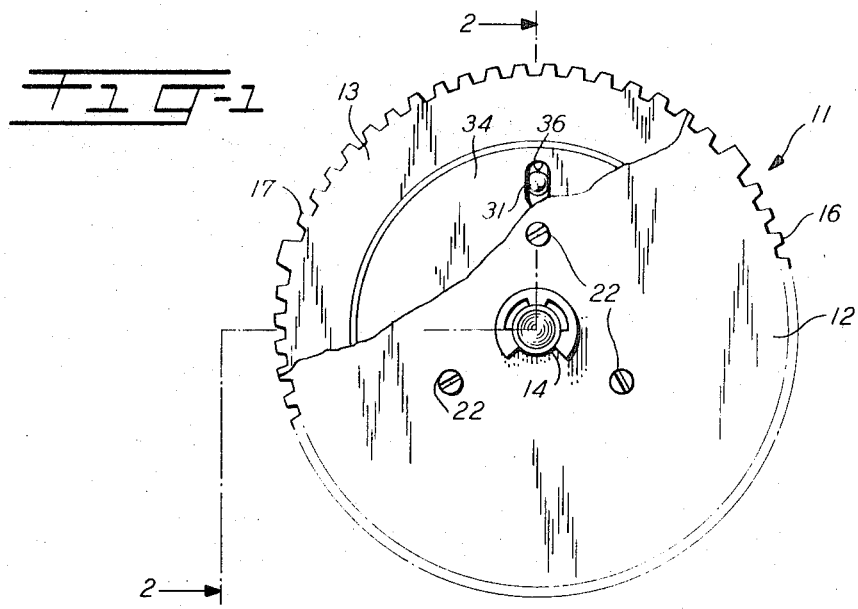
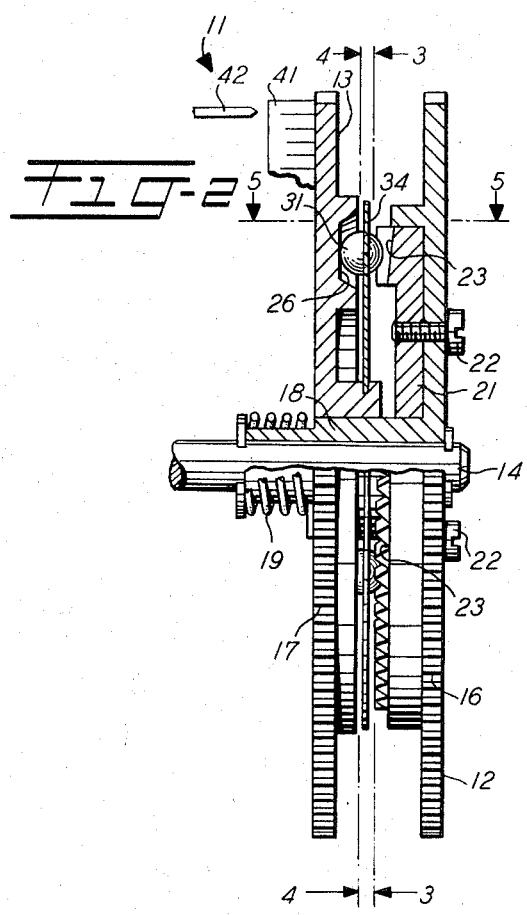
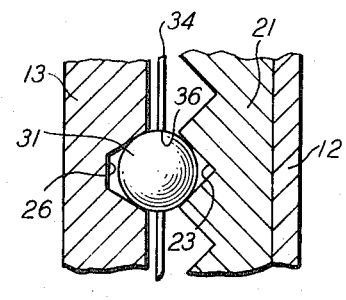
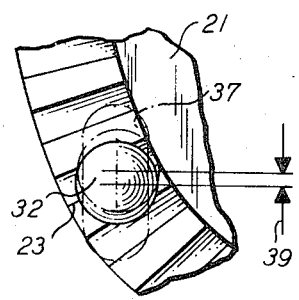

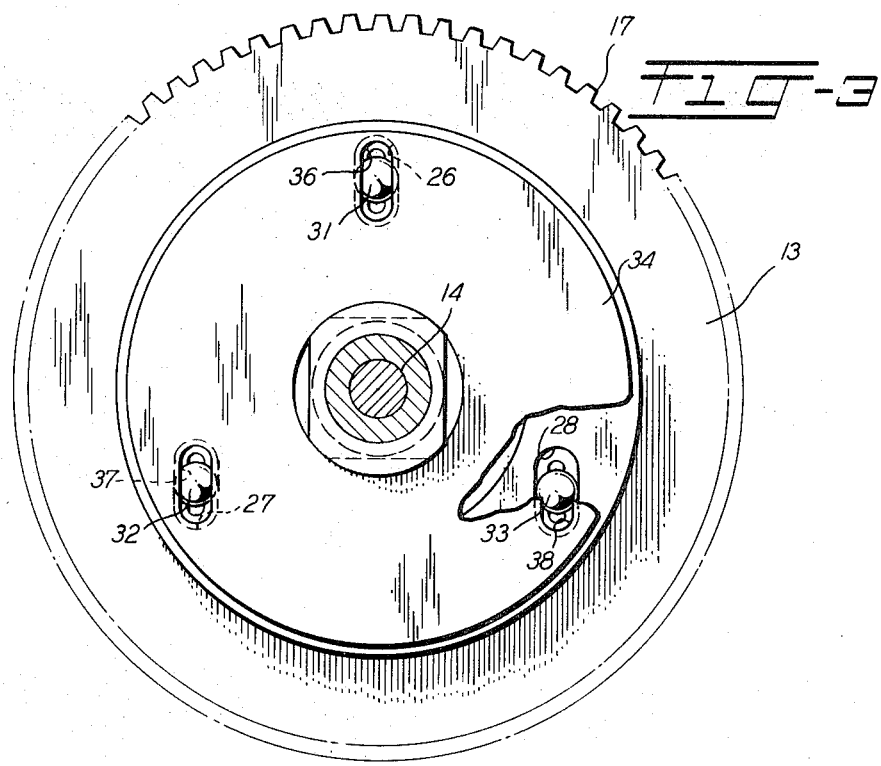
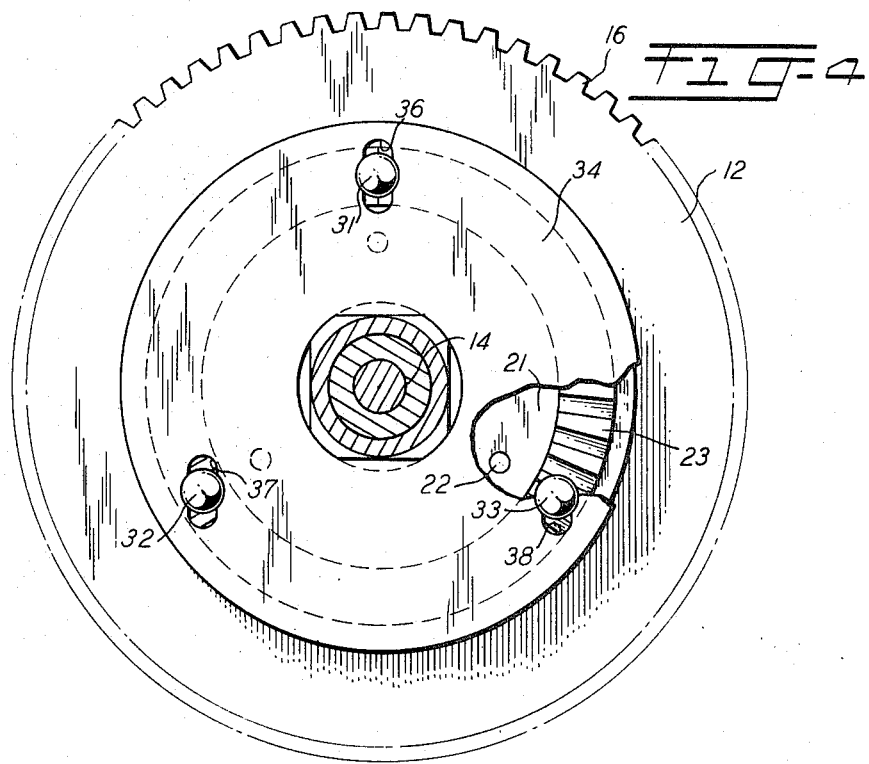

DETENT MECHANISM FOR RELEASABLY SECURING RELATIVELY ROTATABLE MEMBERS

BACKGROUND OF THE INVENTION

This invention relates to a detent mechanism for releasably securing relatively rotatable members, and particularly relates to a detent mechanism for selectively setting the angular relationship about a common axis between a plurality of disks.

In many mechanical operations, it may be desirable to provide an accurately reproducible, recurring angular or rectilinear movement which is adjustable to provide a desired degree of angular or rectilinear motion. For example, form printing equipment generally requires that the printing operation begin on the same line of each of a number of successive, identical forms. This requirement may be fulfilled by a "form-out" mechanism in which reciprocating arms determine a specific length of material to be removed from a material supply and then move the length of material into a printing position, at the same time moving a previously positioned length of material out of the printing position. However, if it becomes desirable to change the length of material removed from the supply, i.e., the form length, the degree of motion of the reciprocating arms must be changed.

One method of providing motion to the reciprocating arms of the form out mechanism includes two disks or gears mounted for rotation about a common axis and connected to the reciprocating arms through a suitable drive means such as a gear train. The relative angular relationship between the two disks about the common axis can then be made proportional to the form length and coupled through the gear train to the reciprocating arms so that the angular relationship of the disks controls the motion of the arms to reproduce a desired form length.

To change the form length, it is necessary to change the relative angular relationship between the two disks. A mechanism for setting this angular relationship must permit the desired angular relationship between the disks to be set without requiring adjustment or realignment of the gear train or other drive means coupled to the disks. The setting mechanism should also facilitate easy and positive manual adjustment of the angular relationship and should not require repeated trials to obtain the desired angular setting, or in the present example, to obtain the desired form length.

SUMMARY OF THE INVENTION

It is, therefore, an object of this invention to provide a new and improved detent mechanism for releasably securing relatively rotatable members.

Another object of this invention is to provide a new and improved detent mechanism for selectively setting the angular relationship about a common axis between a plurality of disks.

A further object of this invention is to provide a new and improved detent mechanism for releasably securing a pair of disks, having a common axis, in a selected angular relationship.

A detent mechanism for releasably securing relatively rotatable members in accordance with a preferred embodiment of the invention may include first and second rotatable members mounted for rotation relative to each other about a common axis, the members being normally urged relatively toward each other by a biasing means. A coupling means, which is attached to one surface of the second rotatable member, is insertable into selected ones of a plurality of radial grooves in the first member, so that the members are releasably secured through the coupling means and by the force of the biasing means.

When the urging force of the biasing means is released temporarily, the setting of a desired angular relationship between the rotatable members may be attained by rotation of the members relative to each other. The set angular relationship is then maintained by the biasing means urging the coupling means on the second member into seating engagement with adjacent ones of the plurality of radial grooves on the first member.

BRIEF DESCRIPTION OF THE DRAWINGS

Other objects, advantages and features of the present invention will be apparent from the following detailed description, when considered in conjunction with the accompanying drawings, in which:

FIG. 1 is an elevation, with a portion broken away, of a detent mechanism for releasably securing relatively rotatable members in accordance with the principles of this invention;

FIG. 2 is a partial cross-sectional view of the detent mechanism taken along line 2—2 of FIG. 1;

FIG. 3 is a cross-sectional view of the detent mechanism taken along line 3—3 of FIG. 2;

FIG. 4 is a cross-sectional view of the detent mechanism taken along line 4—4 of FIG. 2;

FIG. 5 is a partial section taken along line 5—5 of FIG. 2, illustrating a portion of one ball detent mechanism; and FIG. 6 is a detailed view illustrating a portion of one ball detent mechanism in accordance with the principles of this invention.

DETAILED DESCRIPTION

Referring to FIG. 1 there is illustrated a detent mechanism designated generally by the numeral 11, for releasably securing relatively rotatable members, embodying the principles of this invention.

The rotatable members include a first or clutch disk 12 and a second or biased disk 13 which are mounted on a common shaft 14. Each of the disks 12 and 13 may have a series of teeth 16 and 17, respectively, spaced about the outer periphery of each disk for coupling to and driving or being driven by an external mechanism (not shown). The function performed by the external mechanism may be dependent upon the angular relationship of the disks 12 and 13. For example, a form-out or web feeding mechanism in a printing apparatus may be coupled to the disks 12 and 13 through a gear train and may depened upon the angular relationship of the disks to accurately and reproducibly feed a succession of forms into a desired printing position.

Referring now to FIG. 2, the biased disk 13 is slidably mounted on a hub 18 of the clutch disk 12 and is urged toward the clutch disk by a compression spring 19.

A plate 21 is secured to the inner surface of the clutch disk 12 by a plurality of screws 22. The plurality of screws 22 permits a small degree of adjustment between the clutch disk 12 and the plate 21, so that the series of teeth 16 can be aligned with the external mechanism (not shown) coupled to the disk. The plate 21 has a plurality of radial, V-shaped grooves 23 (FIGS. 4 and 5) extending centrally from the periphery of the plate and facing the biased disk 13. The plurality of V-shaped grooves 23 also extend around the entire circumference of the plate 21. It will be apparent that the plurality of V-shaped grooves 23 could also be formed directly in the clutch disk 12.

The inner surface of the biased disk 13 has three detent pockets or depressions 26, 27 and 28 (FIG. 3) equally spaced around the circumference of a circle which is concentric with the biased disk. The circle also has a radius less than the radius of the biased disk 13 but large enough so that each pocket faces the plurality of radial, V-shaped grooves 23 in the plate 21 (FIGS. 4 and 5).

Ball detents 31, 32 and 33 are disposed, respectively, in the detent pockets 26, 27 and 28 and are retained therein by a retaining ring or race 34 which is secured to the biased disk 13 (FIG. 2). The ring 34 has three slots 36, 37 and 38 which are proportioned and located so that the curved surfaces of the ball detents 31, 32 and 33 protrude through the slots toward the clutch disk 12. Each of the slots 36, 37 and 38 is formed with two long sides connected at each end by shorter, curved sides as best illustrated in FIGS. 3 and 6.

As shown in FIGS. 3 and 4, the long sides of the slot 36 are parallel to each other and to each of the long sides of the remaining slots 37 and 38. The long sides of each of the slots 36, 37 and 38 are also spaced apart such that the corresponding ball detents 31, 32 and 33 are prevented from shifting between the long sides of the respective slots. Additionally, the long sides of the slots 36 are disposed in the ring 34 parallel to a radius of the biased disk 13 so that, upon relative rotation of the clutch disk 12 and the biased disk 13 the long sides of the slot 36 can be adjusted into parallelism with any selected one of the plurality of V-shaped grooves 23.

FIG. 5 illustrates the operating engagement of one ball detent mechanism consisting of the detent pocket 26, the ball detent 31 and the ring 34. The curved surface of the ball detent 31 protrudes through the slot 36 and is urged into latching engagement with a selected one of a plurality of V-shaped grooves 23 by the spring 19 (FIG. 2). Thus, the ball detent 31 can be firmly seated in any selected one of the plurality of V-shaped grooves 23 as a primary drive coupling element between the clutch disk 12 and the biased disk 13.

Referring again to FIG. 4, the two short, rounded sides of each of the slots 36, 37 and 38 are spaced apart sufficiently to permit the ball detents 32 and 33 to move within the detent pockets 27 and 28 in a direction parallel to the long sides of the slots.

Referring now to FIG. 6, there is illustrated a detailed view of the slot 37 and the ball detent 32. The short, rounded sides of the slot 37 are spaced apart to permit motion of the ball detent 32 over an adjustment range 39 within the detent pocket 27 (FIG. 3). The maximum motion of the ball detent 32 over the adjustment range 39 may advantageously be equal to the spacing between the bottoms of adjacent grooves of the plurality of V-shaped grooves 23. In consequence, the ball detent 32 is adjustable within the slot 37 so that the ball detent 32 may be seated in one of the plurality of V-shaped grooves 23. Thus, whenever the ball detent 31 engages and seats in any selected one of the plurality of V-shaped grooves 23, the ball detent 32 will automatically adjust to a position permitting engagement with and seating in a corresponding one of the plurality of V-shaped grooves. Similarly, the slot 38 allows the ball detent 33 to engage and seat in one of the plurality of V-shaped grooves 23 whenever the ball detent 31 is seated in any selected one of the V-shaped grooves.

In this manner, the ball detents 32 and 33 seat in the adjacent grooves 23 carried by the clutch disk 12 as auxiliary drive-coupling members and cooperate with ball detent 31 to balance the forces exerted by the spring 19 through the biased disk 13 to the clutch disk 12.

The two short, rounded sides of the slot 36 may also be spaced apart to allow motion of the ball detent 31 within the detent pocket 26, as shown in FIG. 3. Alternately, the ball detent 31 may be fixed in a stationary position within the detent pocket 26.

OPERATION

In operation, the angular relationship between the clutch disk 12 and the biased disk 13 of the detent mechanism 11 may be set, or altered from a previous setting, by holding one of the disks 12 or 13 fixed, and then rotating the other one through a desired angle. In practice, one of the disks is always held fixed, so that the other disk is free to rotate to the desired angular position. In this example, the adjustment is done, manually, by merely turning the free disk with the fingers. When the free disk is turned, the spring 19 permits the ball detents 31–33 to ratchet relative to the grooves 23, to the new, desired position. When the new position is reached, the ball detent 31 firmly seats itself in the selected goove 23. The ball detents 32 and 33 are also moved into engagement with the adjacent V-shaped grooves 23, with those detents moving longitudinally in the slots 37 and 38, respectively, to seal the detents in corresponding grooves. The spring 19 then forces the detents and grooves together, to hold the new position, as previously described, after which the two disks are again coupled together for simultaneous rotation.

The angular position may be gaged in any suitable manner, using reference markings of any desired kind on one or both disks. In one example, the disk 13 is provided with a scale 41 (FIG. 2), which is aligned in a desired position with a fixed pointer 42 to set the desired angle. Once the disks 12–13 of the detent mechanism 11 have been set, the mechanism may then be utilized for various purposes, particularly to drive or control the operation of other mechanisms by common rotation of the disks 12 and 13 through predetermined angles set by the orientation of disks 12 and 13.

In a specific embodiment of use for the invention, the detent mechanism 11 is used in controlling the stepping motion of a form out mechanism for feeding paper for teleprinters. The feeding mechanism may be generally along the lines of that disclosed in R. R. Hughes, Jr. U. S. Pat. No. 1,371,373 (1921). In this example, the gear disks 12 and 13 are alternately engaged by a pair of driven gears or pawls (not shown) in the drive train for the feeding mechanism, which turn in opposite directions. This rotates the disks 12 and 13 alternately in opposite directions, to oscillate the shaft 14 (since the disks 12 and 13 have been coupled for conjoint rotation through the ball detent mechanism after the angle has been set).

Each of the disks 12 and 13 carries a switching arm or lever (not shown), which operates to control the advancement of the main drive mechanism, and also to reverse the rotation of the shaft 14 after the disks have rotated through a predetermined angle. By adjusting the angular positions of the disks 12–13, the angle of oscillation can be varied as desired, within limits set by the spacing of the grooves 23, to control the strke of form-out mechanism generally as disclosed in the Hughes, Jr. patent.

In one example, 74 equally spaced grooves 23 were used, corresponding to angular adjustment intervals of 4.9° between the disks, and through appropriate gearing to regulate the paper advance in 1/16 inch steps. With this arrangement, the form-out mechanism was adjustable to start at any of 66 possible lines on a page.

It should be understood that the principles of the invention, in providing angularly adjustable disks or gears 12–13, can be used for many other drive and control purposes than that described above, which basically involves a linear drive of variable stroke and starting point. For example, the disks 12–13 could be used generally as timing elements, with switch actuators carried thereby at variable preset positions so as to actuate two or more switches at prescribed, presettable times as the disks rotate or oscillate. It is to be understood that various other embodiments and uses of the invention may be devised by those skilled in the art, which will employ the principles of the invention and fall within the spirit and scope thereof.

What is claimed is:

1. A detent mechanism for releasably securing relatively rotatable members which comprises:
    a first rotatable member having a plurality of radially extending grooves formed in one surface thereof;
    a second rotatable member;
    a plurality of ball detents on one surface of said second rotatable member, said ball detents being equally spaced around the circumference of a circle concentric with said second rotatable member, said circle having a radius less than the radius of said second rotatable member;
    a retaining ring having a plurality of slots formed therein and attached to said one surface of said second rotatable member so that a portion of each of said plurality of ball detents protrudes therethrough and toward said grooves of said first rotatable member, one of said plurality of slots formed parallel to the radius of said second rotatable member and extending in a radial direction so that one of said plurality of ball detents disposed in said one slot is alignable with any selected one of said plurality of grooves in said first rotatable member thereby setting a selected angular relationship between said first and second rotatable member, the remaining ones of said plurality of slots formed parallel to said one slot so that each of the remaining ones of said plurality of ball detents are movable in said slots over an adjustment range to fully engage and seat in corresponding selected ones of the plurality of grooves;
    a shaft extending through the centers of said first and second rotatable members and joined to said first rotatable member so that said second rotatable member is slidable along said shaft and is rotatable relative to said first rotatable member; and
    means for releasably urging said second rotatable member along said shaft so that said plurality of ball detents contact and engage said selected ones of said plurality of grooves thereby releasably coupling said first and second rotatable members in the selected angular position.

2. A detent mechanism as set forth in claim 1 wherein said second rotatable member further comprises:
    a plurality of depressions formed in one surface of said second rotatable member so that said plurality of depressions are equally spaced around the circumference of a circle concentric with said second rotatable member, said circle having a radius less than the radius of said second rotatable member, each of said plurality of ball detents being disposed in an associated one of said plurality of depressions.

3. A detent mechanism as set forth in claim 1 wherein said urging means comprises a spring having one end engageable with said shaft and having the remaining end bearing upon said second rotatable member so that said second rotatable member is normally urged toward, and thereby releasably coupled to, said first rotatable member.

4. A detent mechanism for releasably securing relatively rotatable members which comprises:
    a first rotatable member having a plurality of radially extending grooves formed in one surface;
    a second rotatable member having a plurality of depressions formed in one surface, each of said plurality of depressions being equidistant from the center of said second rotatable member;
    a plurality of ball detents, each of said plurality of ball detents being disposed in an associated one of said plurality of depressions;
    means, having a plurality of slots formed therein, for retaining said plurality of ball detents in said plurality of depressions, one of said plurality of slots formed parallel to a radius of said second rotatable member and extending in a radial direction so that one of said plurality of ball detents disposed in said one slot is alignable with any selected one of said plurality of grooves in said first rotatable member thereby setting a selected angular relationship between said first and second rotatable members, the remaining ones of said plurality of slots formed parallel to said one slot so that each of the remaining ones of said plurality of ball detents are movable over an adjustment range to fully engage and seal in corresponding selected ones of the plurality of grooves;
    a shaft extending through said first and second rotatable members to mount said rotatable members in a relative position along a common axis so that said plurality of grooves of said first rotatable member faces said plurality of ball detents of said second rotatable member, said second rotatable member being slidable along said shaft and rotatable relative to said first rotatable member to align said first and second rotatable members in the selected angular relationship; and
    means for releasably urging said second rotatable member along said shaft toward said first rotatable member so that said plurality of ball detents of said second rotatable member engage and seat in the selected ones of said plurality of grooves in said first rotatable member thereby releasably securing said first and second rotatable members in the selected angular relationship.

5. A detent mechanism as set forth in claim 4 wherein said urging means comprises a spring having one end engageable with said shaft and having the remaining end bearing upon said second rotatable member so that said second rotatable member is releasably coupled to said first rotatable member.

6. A detent mechanism as set forth in claim 5 wherein said retaining means further comprises a retaining ring attached to said one surface of said second rotatable member and having a plurality of slots, each of said plurality of slots coinciding with each of said plurality of depressions so that a portion of each of said plurality of ball detents protrudes through each of said plurality of slots.

* * * * *